(12) United States Patent
Adest et al.

(10) Patent No.: US 8,004,117 B2
(45) Date of Patent: Aug. 23, 2011

(54) CURRENT BYPASS FOR DISTRIBUTED POWER HARVESTING SYSTEMS USING DC POWER SOURCES

(75) Inventors: Meir Adest, Raanana (IL); Lior Handelsman, Givataim (IL); Yoav Galin, Raanana (IL); Amir Fishelov, Tel Aviv (IL); Guy Sella, Bitan Aharon (IL)

(73) Assignee: Solaredge, Ltd., Herzelia (IL)

( * ) Notice: Subject to any disclaimer, the term of this patent is extended or adjusted under 35 U.S.C. 154(b) by 0 days.

(21) Appl. No.: 13/034,675

(22) Filed: Feb. 24, 2011

(65) Prior Publication Data
US 2011/0140536 A1 Jun. 16, 2011

Related U.S. Application Data

(62) Division of application No. 11/950,224, filed on Dec. 4, 2007, now Pat. No. 7,900,361.

(60) Provisional application No. 60/868,851, filed on Dec. 6, 2006, provisional application No. 60/868,893, filed on Dec. 6, 2006, provisional application No. 60/868,962, filed on Dec. 7, 2006, provisional application No. 60/908,095, filed on Mar. 26, 2007, provisional application No. 60/916,815, filed on May 9, 2007.

(51) Int. Cl.
*H02J 1/00* (2006.01)
*H02J 3/00* (2006.01)

(52) U.S. Cl. ........................................................ 307/80
(58) Field of Classification Search .................... 307/45, 307/80, 86
See application file for complete search history.

(56) References Cited

U.S. PATENT DOCUMENTS

| | | | |
|---|---|---|---|
| 4,452,867 A | 6/1984 | Conforti | |
| 4,641,079 A | 2/1987 | Kato et al. | |
| 4,783,728 A | 11/1988 | Hoffman | |
| 4,987,360 A | 1/1991 | Thompson | |
| 5,280,232 A | 1/1994 | Kohl et al. | |
| 5,548,504 A | 8/1996 | Takehara | |
| 5,604,430 A | 2/1997 | Decker et al. | |

(Continued)

FOREIGN PATENT DOCUMENTS
EP 0420295 A1 4/1991
(Continued)

OTHER PUBLICATIONS

International Search Report for PCT/IB2007/004610 dated Feb. 23, 2009.

(Continued)

*Primary Examiner* — Jared J Fureman
*Assistant Examiner* — Carlos Amaya
(74) *Attorney, Agent, or Firm* — Nixon Peabody LLP; Joseph Bach

(57) ABSTRACT

A converter circuit providing multiple current bypass routes between the output leads to provide reliability in a series connection of several converters. If the converter malfunctions due to component failure, the current bypass routes provide a path for the current that views the malfunctioning converter as substantially a short. Diodes prevent backflow into the power source connected to the converter. Redundancy is provided in the bypass portions of the converter circuit that provides alternate parallel paths in case a defective component in one of the paths opens the circuit along that path. In one example, the converter is implemented as a buck plus boost converter where either the buck or the boost portion or both are operative responsive to a controller controlling the switches of both portions. Most of the converter circuit may be implemented in an integrated circuit.

21 Claims, 11 Drawing Sheets

U.S. PATENT DOCUMENTS

| | | |
|---|---|---|
| 5,646,501 A | 7/1997 | Fishman et al. |
| 5,773,963 A | 6/1998 | Blanc et al. |
| 5,780,092 A | 7/1998 | Agbo et al. |
| 5,798,631 A | 8/1998 | Spee et al. |
| 5,801,519 A | 9/1998 | Midya et al. |
| 5,804,894 A | 9/1998 | Leeson et al. |
| 5,821,734 A | 10/1998 | Faulk |
| 5,838,148 A | 11/1998 | Kurokami et al. |
| 5,869,956 A | 2/1999 | Nagao et al. |
| 5,886,890 A | 3/1999 | Ishida et al. |
| 5,892,354 A | 4/1999 | Nagao et al. |
| 5,923,158 A | 7/1999 | Kurokami et al. |
| 5,945,806 A | 8/1999 | Faulk |
| 5,963,010 A | 10/1999 | Hayashi et al. |
| 5,990,659 A | 11/1999 | Frannhagen |
| 6,031,736 A | 2/2000 | Takehara et al. |
| 6,046,919 A | 4/2000 | Madenokouji et al. |
| 6,050,779 A | 4/2000 | Nagao et al. |
| 6,082,122 A | 7/2000 | Madenokouji et al. |
| 6,111,188 A | 8/2000 | Kurokami et al. |
| 6,111,391 A | 8/2000 | Cullen |
| 6,111,767 A | 8/2000 | Handleman |
| 6,163,086 A | 12/2000 | Choo |
| 6,166,455 A | 12/2000 | Li |
| 6,166,527 A | 12/2000 | Dwelley et al. |
| 6,169,678 B1 | 1/2001 | Kondo et al. |
| 6,255,360 B1 | 7/2001 | Domschke et al. |
| 6,259,234 B1 | 7/2001 | Perol |
| 6,262,558 B1 | 7/2001 | Weinberg |
| 6,285,572 B1 | 9/2001 | Onizuka et al. |
| 6,320,769 B2 | 11/2001 | Kurokami et al. |
| 6,339,538 B1 | 1/2002 | Handleman |
| 6,493,246 B2 | 12/2002 | Suzui et al. |
| 6,531,848 B1 | 3/2003 | Chitsazan et al. |
| 6,545,211 B1 | 4/2003 | Mimura |
| 6,548,205 B2 | 4/2003 | Leung et al. |
| 6,590,793 B1 | 7/2003 | Nagao et al. |
| 6,608,468 B2 | 8/2003 | Nagase |
| 6,611,441 B2 | 8/2003 | Kurokami et al. |
| 6,678,174 B2 | 1/2004 | Suzui et al. |
| 6,690,590 B2 | 2/2004 | Stamenic et al. |
| 6,738,692 B2 | 5/2004 | Schienbein et al. |
| 6,768,047 B2 | 7/2004 | Chang et al. |
| 6,788,033 B2 | 9/2004 | Vinciarelli |
| 6,801,442 B2 | 10/2004 | Suzui et al. |
| 6,914,418 B2 | 7/2005 | Sung |
| 6,919,714 B2 | 7/2005 | Delepaut |
| 6,927,955 B2 | 8/2005 | Suzui et al. |
| 6,936,995 B2 | 8/2005 | Kapsokavathis et al. |
| 6,963,147 B2 | 11/2005 | Kurokami et al. |
| 6,984,970 B2 | 1/2006 | Capel |
| 7,030,597 B2 | 4/2006 | Bruno et al. |
| 7,031,176 B2 | 4/2006 | Kotsopoulos et al. |
| 7,042,195 B2 | 5/2006 | Tsunetsugu et al. |
| 7,046,531 B2 | 5/2006 | Zocchi et al. |
| 7,053,506 B2 | 5/2006 | Alonso et al. |
| 7,072,194 B2 | 7/2006 | Nayar et al. |
| 7,079,406 B2 | 7/2006 | Kurokami et al. |
| 7,087,332 B2 | 8/2006 | Harris |
| 7,090,509 B1 | 8/2006 | Gilliland et al. |
| 7,091,707 B2 | 8/2006 | Cutler |
| 7,126,053 B2 | 10/2006 | Kurokami et al. |
| 7,126,294 B2 | 10/2006 | Minami et al. |
| 7,148,669 B2 | 12/2006 | Maksimovic et al. |
| 7,385,833 B2 | 6/2008 | Keung |
| 2003/0080741 A1 | 5/2003 | LeRow et al. |
| 2004/0201279 A1 | 10/2004 | Templeton |
| 2005/0057214 A1 | 3/2005 | Matan |
| 2005/0057215 A1 | 3/2005 | Matan |
| 2005/0068820 A1 | 3/2005 | Radosevich et al. |
| 2005/0172995 A1 | 8/2005 | Rohrig et al. |
| 2006/0001406 A1 | 1/2006 | Matan |
| 2006/0108979 A1 | 5/2006 | Daniel et al. |
| 2006/0149396 A1 | 7/2006 | Templeton |
| 2006/0162772 A1 | 7/2006 | Presher, Jr. et al. |
| 2006/0174939 A1 | 8/2006 | Matan |
| 2006/0185727 A1 | 8/2006 | Matan |
| 2006/0192540 A1 | 8/2006 | Balakrishnan et al. |
| 2006/0227578 A1 | 10/2006 | Datta et al. |
| 2007/0044837 A1 | 3/2007 | Simburger et al. |
| 2007/0159866 A1 | 7/2007 | Siri |
| 2008/0097655 A1 | 4/2008 | Hadar et al. |
| 2008/0143188 A1 | 6/2008 | Adest et al. |
| 2008/0150366 A1 | 6/2008 | Adest et al. |
| 2008/0238195 A1 | 10/2008 | Shaver et al. |

FOREIGN PATENT DOCUMENTS

| | | |
|---|---|---|
| EP | 0604777 A1 | 7/1994 |
| EP | 1531545 A2 | 5/2005 |
| EP | 1657797 A1 | 5/2006 |
| ES | 2249149 | 3/2006 |
| JP | 2003-134667 A | 5/2003 |
| JP | 2007-058845 A | 3/2007 |
| WO | WO 93/13587 A1 | 7/1993 |
| WO | WO 96/13093 A1 | 5/1996 |
| WO | WO 98/23021 A2 | 5/1998 |
| WO | WO 03/050938 A2 | 6/2003 |
| WO | WO 03/071655 A1 | 8/2003 |
| WO | WO 2004/023278 A2 | 3/2004 |
| WO | WO 2004/090993 A2 | 10/2004 |
| WO | WO 2005/076445 A1 | 8/2005 |
| WO | WO 2006/078685 A2 | 7/2006 |
| WO | WO 2007/006564 A2 | 1/2007 |
| WO | WO 2007/084196 A2 | 7/2007 |
| WO | WO 2007/113358 A1 | 10/2007 |

OTHER PUBLICATIONS

International Search Report for PCT/IB2007/004584 dated Jan. 28, 2009.

International Search Report for PCT/IB2007/004586 dated Mar. 5, 2009.

International Search Report for PCT/IB2007/004643 dated Jan. 30, 2009.

International Search Report for PCT/US2008/085736 dated Jan. 28, 2009.

International Search Report for PCT/US2008/085754 dated Feb. 9, 2009.

International Search Report for PCT/US2008/085755 dated Feb. 3, 2009.

Atsushi Kajihara, et al. "Model of Photovoltaic Cell Circuits Under Partial Shading," 2005 IEEE, pp. 866-870.

Werner Knaupp, et al., "Operation of a 10 KW PV Façade with 100 W AC Photovoltaic Modules," 1996 IEEE, $25^{th}$ PVSC, May 13-17, 1996, pp. 1235-1238, Washington, D.C.

O. Alonso, et al., "Cascaded H-Bridge Multilevel Converter for Grid Connected Photovoltaic Generators with Independent Maximum Power Point Tracking of Each Solar Array," 2003 IEEE $34^{th}$, Annual Power Electronics Specialists Conference, Acapulco, Mexico, Jun. 15-19, 2003, pp. 731-735, vol. 2.

J.M.A. Myrzik, et al., "String and Module Integrated Inverters for Single-Phase Grid Connected Photovoltaic Systems—A Review," Power Tech Conference Proceedings, 2003 IEEE Bologna, Jun. 23-26, 2003 pp. 8, vol. 2.

Jingquan Chen, et al., "Predictive Digital Current Programmed Control," IEEE Transactions on Power Electronics, vol. 18, Issue 1, Jan. 2003.

K. Wallace, et al, "DSP Controlled Buck/Boost Power Factor Correction for Telephony Rectifiers," Telecommunications Energy Conference, 2001. INTELEC 2001. Twenty-Third International, Oct. 18, 2001, pp. 132-138.

Alonso, R., "A New Distributed Converter Interface for PV Panels," $20^{th}$ European Photovoltaic Solar Energy Conference, Jun. 6-10, 2005, Barcelona, Spain. pp. 2288-2291.

Alonso, R., "Experimental Results of Intelligent PV Module for Grid-Connected PV Systems," $21^{st}$ European Photovoltaic Solar Energy Conference, Sep. 4-8, 2006, Dresden, Germany.pp. 2297-2300.

Enslin, Johan H. R., "Integrated Photovoltaic Maximum Power Point Tracking Converter," IEEE Transactions on Industrial Electronics, vol. 44, No. 6, Dec. 1997. pp. 769-773.

Lindgren, Bjorn, "Topology for Decentralised Solar Energy Inverters with a Low Voltage AC-Bus," Chalmers University of Technology, Department of Electrical Power Engineering, EPE '99—Lausanne.

Nikraz, Magid, "Digital Control of a Voltage Source Inverter in Photovoltaic Applications," 2004 35th Annual IEEE Power Electronics Specialists Conference, Aachen, Germany, 2004. pp. 3266-3271.

Orduz, R., "Evaluation Test Results of a New Distributed MPPT Converter," 22nd European Photovoltaic Solar Energy Conference, Sep. 3-7, 2007, Milan, Italy.

Palma, L., "A Modular Fuel Cell, Modular DC-DC Converter Concept for High Performance and Enhanced Reliability," IEEE 2007. pp. 2633-2638.

Quaschning, Volker, "Cost Effectiveness of Shadow Tolerant Photovoltaic Systems," Berlin University of Technology, Institute of Electrical Energy Technology, Renewable Energy Section. EuroSun'96. pp. 819-824.

Roman, E., "Intelligent PV Module for Grid-Connected PV Systems," IEEE Transactions on Industrial Electronics, vol. 53, No. 4, Aug. 2006. pp. 1066-1073.

Roman, E., "Power Line Communications in Modular PV Systems," 20th European Photovoltaic Solar Energy Conference, Jun. 6-10, 2005, Barcelona, Spain. pp. 2249-2252.

Uriarte, S., "Energy Integrated Management System for PV Applications," 20th European Photovoltaic Solar Energy Conference, Jun. 6-10, 2005, Barcelona, Spain. pp. 2292-2295.

Walker, Geoffrey R., "Cascaded DC-DC Converter Connection of Photovoltaic Modules," IEEE Transactions on Power Electronics, vol. 19, No. 4, Jul. 2004. pp. 1130-1139.

CURRENT BYPASS FOR DISTRIBUTED POWER HARVESTING SYSTEMS USING DC POWER SOURCES

CROSS-REFERENCE TO RELATED APPLICATIONS

This Application is a divisional of U.S. patent application Ser. No. 11/950,224, filed Dec. 4, 2007 now U.S. Pat. No. 7,900,361, which claims priority to U.S. Provisional Patent Applications, Ser. No. 60/868,851, filed Dec. 6, 2006, and titled "Distributed Solar Array Monitoring, Management and Maintenance," Ser. No. 60/868,893, filed Dec. 6, 2006, and titled "Distributed Power Harvesting System for Distributed Power Sources," 60/868,962, filed Dec. 7, 2006, and titled "System, Method and Apparatus for Chemically Independent Battery," Ser. No. 60/908,095, filed Mar. 26, 2007, and titled "System and Method for Power Harvesting from Distributed Power Sources," and Ser. No. 60/916,815, filed May 9, 2007, and titled "Harvesting Power From Direct Current Power Sources," the entire contents of which are incorporated herein by reference. Further, this Application is related to ordinary U.S. Patent Applications titled "Distributed Power Harvesting Systems Using DC Power Sources," "Monitoring of Distributed Power Harvesting Systems Using DC Power Sources," "Removable Component Cartridge for Increasing Reliability in Power Harvesting Systems," "Battery Power Delivery Module," and "A Method for Distributed Power Harvesting Using DC Power Sources" that are filed in at the U.S. Patent and Trademark Office on Dec. 4, 2007 and incorporates the entire content of these applications by this reference.

BACKGROUND

1. Field of the Invention

The field of the invention relates generally to management of distributed DC power sources, and even more particularly to maintaining reliability in distributed DC power sources, such as fuel cells, solar array applications, etc., in the case of component malfunction.

2. Related Arts

Distributed power harvesting system generally comprise several DC power sources, such as, e.g., batteries, fuel sells, solar panels, etc., that are connected together to form a power supply. Batteries with numerous cells or hybrid vehicles with multiple fuel cells are examples of DC power sources whose power is accumulated through a series connection in a distributed power harvesting system. Another example is photovoltaic (PV) cells or solar panel power system. Solar energy is obtained from solar cells that provide a clean alternative source of energy. Solar installations include solar panels that convert the light energy to electric power and electronic power harvesting systems that harvest the electric power from the panels and convert it for domestic use. The electronic system is generally referred to in the art as balance of system (BoS).

Each of the individual DC power sources usually provides low voltage (e.g., batteries normally provide less than 3 volts) and low current. Consequently, DC-DC converters are used together with various series and parallel topologies to convert the DC power provided from the DC power sources into the required voltage and/or current. In some applications, each DC power source is connected to its own DC-DC converter, and the outputs of the converters are coupled in series or parallel topology.

Maintaining reliability in both series and parallel connections is important. Malfunction of one may disturb the operation of the entire installation. For example, in series connections an open circuit malfunction in one converter may stop the flow of current in the entire series connection. On the other hand, in parallel connection a short malfunction in one arm of the circuit would reduce the voltage between the parallel nodes to zero.

FIG. 1 illustrates one possible architecture for distributed power harvesting system. In the system of FIG. 1, each DC power source 101, for example, battery, fuel cell, solar panel etc., is connected to its own associated AC module 109. The AC module 109 may include a DC-to-DC converter 105 and an inverter 114 (when the load requires alternating current). The converter 105 is used for DC to DC conversion of the input voltage—usually as means of maximizing power output from DC source by staying at maximum power point. The inverter 114 is used for inversion of the DC input to an AC output. As such, the power conversion and inversion is distributed within the circuit as opposed to being performed on a centralized collection of the power from the entire circuit. The input of each AC module 109 is connected to one of the panels 101. Each AC module may be used independently and individually. Alternatively, outputs of the AC modules 109 may be connected in parallel to an AC bus 111. The AC bus 111 may be connected to the load, such as, for example, the electric box of a house.

FIG. 2 illustrates another possible architecture for distributed power harvesting system using multiple DC power sources. In the system of FIG. 2, each DC power source 101, e.g., battery, fuel cell, solar panel, etc., is connected to its own associated DC-DC converter 205. As such, the power conversion is distributed within the circuit as opposed to being performed on a centralized collection of the power from the entire circuit. The converters 205 are connected in series to provide a string of serially connected DC converters. The output from the series connection of the converters 205 is provided to the common inverter 104. The converters 205 are DC-to-DC converters and the DC current and voltage are converted to an alternating current at the inverter 104.

In power harvesting from distributed sources, if one of the components in a series-connected group of power sources fails, the circuit is liable to become open and disconnect the current. If one of the components in a parallel-connected group of power sources fails, the circuit is liable to short the current through the entire parallel connection and take the voltage to zero. The reliability of the components is crucial to the success of distributed installations. The cost of parts and labor for maintenance and replacement of parts are burdensome, especially when considering the fact that the components may be located on roofs and other hard-to-get locations. Therefore, there is a need to increase the overall reliability of the components in distributed power harvesting systems.

SUMMARY

The following summary of the invention is provided in order to provide a basic understanding of some aspects and features of the invention. This summary is not an extensive overview of the invention, and as such it is not intended to particularly identify key or critical elements of the invention, or to delineate the scope of the invention. Its sole purpose is to present some concepts of the invention in a simplified form as a prelude to the more detailed description that is presented below.

According to aspects of the invention, there is provided a current bypass in converters used in distributed DC power sources system, such as, e.g., photovoltaic panels installation, to increase the overall reliability of the power harvesting circuit in the case of component failure, and allow other series-connected circuits to keep on functioning as normal.

According to aspects of the invention, a distributed power harvesting system is provided, comprising: a plurality of power sources each providing DC power; a plurality of converters, each converter comprising: input terminals receiving input voltage from, and coupled to, a respective power source from the plurality of power sources; output terminals for providing an output voltage; circuitry receiving and converting the input voltage to the output voltage; and at least one bypass path providing a path bypassing at least part of the circuitry. The circuitry may comprise: a buck portion providing a stepped down output voltage; a boost portion providing a stepped up output voltage; and a controller selectively engaging the buck portion or the boost portion or both. The distributed power harvesting system may further comprise: a plurality of maximum power point tracking circuits, each coupled to a respective power source for tracking power input from the respective power source; and wherein at each of the converters, the controller selectively engages the buck portion or the boost portion or both in response to signal from the maximum power point tracking circuit. The bypass path may circumvent the buck portion and the boost portion. The bypass path may pass through the buck portion. The bypass path may pass through the boost portion.

The bypass path may comprise: a first current path circumventing the buck portion and the boost portion; a second current path passing through the buck portion; and a third current path passing through the boost portion. The buck portion and the boost portion may share an inductive coil; wherein at least one of the first, second and third, current paths passes through the inductive coil; and, wherein at least one of the first, second and third, current paths circumvents the inductive coil. The buck portion and boost portion may share an inductor; and wherein the buck portion comprises a buck switching circuitry and a buck switching bypass path; and wherein the boost portion comprises a boost switching circuitry and a boost switching bypass path. The buck switching circuitry may comprise a plurality of buck switching elements and the buck switching bypass path comprises a plurality of current paths, each bypassing one of the buck switching elements; and the boost switching circuitry may comprise a plurality of boost switching elements and the boost switching bypass path comprises a plurality of current paths, each bypassing one of the boost switching element. The output terminals are coupled in series to at least one other converter, to thereby generate a series connection of the plurality of converters, the distributed power harvesting system may further comprise an inverter coupled to the series connection of the plurality of converters and changing a direct current input from the converters to an alternating current output. The system may further comprise: an inverter coupled to each of the plurality of converters and forming an AC module together with the converter, wherein the AC modules are coupled in parallel to provide a collective current from the distributed power harvesting system, and wherein each converter comprises at least one current blocking element for preventing a short through the converter in a reverse direction. A portion of each of the converters may be implemented in an integrated circuit.

According to further aspects of the invention, a DC-to-DC power converter for converting an input voltage from a DC power source to an output voltage is provided, the DC-to-DC power converter comprising: a buck portion providing a stepped down output voltage; a boost portion for providing a stepped up output voltage; an inductor coupled to the buck portion and the boost portion; and a controller selectively engaging the buck portion or the boost portion or both. The converter may further comprise a maximum power point tracking (MPPT) circuit for providing a MPPT input signal, and wherein the controller selectively engages the buck portion or the boost portion or both in response to the MPPT input signal. The converter may further comprise a boost bypass path providing a current path bypassing the boost portion through the buck portion. The converter may further comprise: a diode coupled in parallel with a first switch of the buck portion, wherein a current through the diode and a current through a parasitic diode associated with the first switch are parallel. The converter may further comprise a buck bypass path providing a current path bypassing the buck portion through the boost portion. The converter may further comprise: a diode coupled in parallel with a first switch of the boost portion, wherein a current through the diode and a current through a parasitic diode associated with the first switch are parallel. A portion of the DC-to-DC power converter may be implemented in an integrated circuit.

According to other aspects of the invention, a distributed power harvesting system is provided, comprising: a plurality of power sources each providing DC power; a plurality of converters, each converter comprising: a buck portion providing a stepped down output voltage from the DC power; a boost portion for providing a stepped up output voltage from the DC power; an inductor coupled to the buck portion and the boost portion; at least one bypass path providing a path bypassing at least on of the buck portion and the buck portion; and a controller selectively engaging the buck portion or the boost portion or both. The distributed power harvesting system may further comprise: a plurality of maximum power point tracking circuits, each tracking DC power from a respective power source; and wherein the controller of each of the plurality of the converters independently selectively engages the buck portion or the boost portion or both in response to a signal from a respective maximum power point tracking circuit. Each of the plurality of power sources may comprise a solar panel. Each of the plurality of power sources may be a fuel cell. Each of the plurality of converters may further comprise a boost bypass path providing a current path bypassing the boost portion through the buck portion. Each of the plurality of converters may further comprise a buck bypass path providing a current path bypassing the buck portion through the boost portion. The distributed power harvesting system may further comprise an inverter coupled to a series connection of the plurality of converters and changing a direct current input from the converters to an alternating current output.

According to further aspects of the invention, a method for providing one or more current bypass routes in a series connection of power cells is provided, the method comprising: coupling each of the power cells to a corresponding converter; coupling output leads of the converters in series; and providing a plurality of current bypass routes in each of the converters, wherein the current bypass routes provide routes between the output leads of each of the converters from a negative output lead to a positive output lead and prevent current flow from the positive output lead to the negative output lead. The method may further comprise: providing a buck portion in each of the converters; providing a boost portion in each of the converters; and selectively activating either the buck portion or the boost portion or both using a controller included in each of the converters, wherein at least one of the current bypass routes is provided in the buck portion and at least one of the current bypass routes is provided in the boost portion. The method may further comprise providing overall bypass routes in each of the converters, the overall bypass route passing outside the buck portion and the boost portion. The method may further comprise: providing redundancy by forming some of the current bypass routes parallel to portions of other current bypass routes.

According to yet other aspects of the invention, a distributed DC photovoltaic power harvesting system is provided, comprising: a plurality of solar panels, each converting solar energy into electrical current; a plurality of converters, each coupled to one of the solar panels, and each providing converted output voltage; and an inverter coupled to a series connection of the converters and changing a direct current input from the converters to an alternating current output; wherein each of the converters includes: a negative input lead and a positive input lead; a negative output lead and a positive output lead; a first diode coupled to the negative output lead; a second diode coupled to the positive output lead; a maximum power point tracking circuit for tracking power input from the solar panel; a buck portion for providing a stepped down output voltage from the converter; a boost portion for providing a stepped up output voltage from the converter; an inductor coupled between the first diode and the second diode, the inductor being shared by the buck portion and the boost portion; and a controller for determining whether the buck portion or the boost portion or both are operating at a given time responsive to the maximum power point tracking circuit; wherein a first current bypass route passes from the negative output lead to the first diode, to an inductor, to the second diode and to the positive output lead, wherein the first diode and the second diode prevent current flow from the positive output lead to the negative output lead, wherein the buck portion includes: a first switch coupled between the positive input lead and the inductor and being controlled by the controller; and a second switch coupled between the negative input lead and the inductor and being controlled by the controller, wherein a second current bypass route passes from the negative output lead to the second switch, to the inductor and to the positive output lead; wherein a third current bypass route passes from the negative output lead to the first diode, to the inductor, to the second diode and to the positive output lead, and wherein the first diode is parallel with the second switch; wherein the boost portion includes: a third switch coupled between the inductor and the positive output lead and being controlled by the controller; and a fourth switch coupled between the negative input lead and the inductor and being controlled by the controller, wherein a fourth current bypass route passes from the negative output lead to the fourth switch, to the third switch and to the positive output lead, wherein a fifth current bypass route passes from the negative output lead to the first diode, to the inductor, to the second diode and to the positive output lead, and wherein the second diode is parallel with the third switch.

According to yet other aspects of the invention, a solar panel is provided, comprising: one or more solar cells, each converting solar energy to electrical energy; one or more switching devices, each connected across a respective solar cell thereby forming a bypass path. The switching device may comprise a transistor. The solar panel may further comprise one or more diodes, each coupled across a respective solar cell to form a second bypass path.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

DETAILED DESCRIPTION

Figure 1:
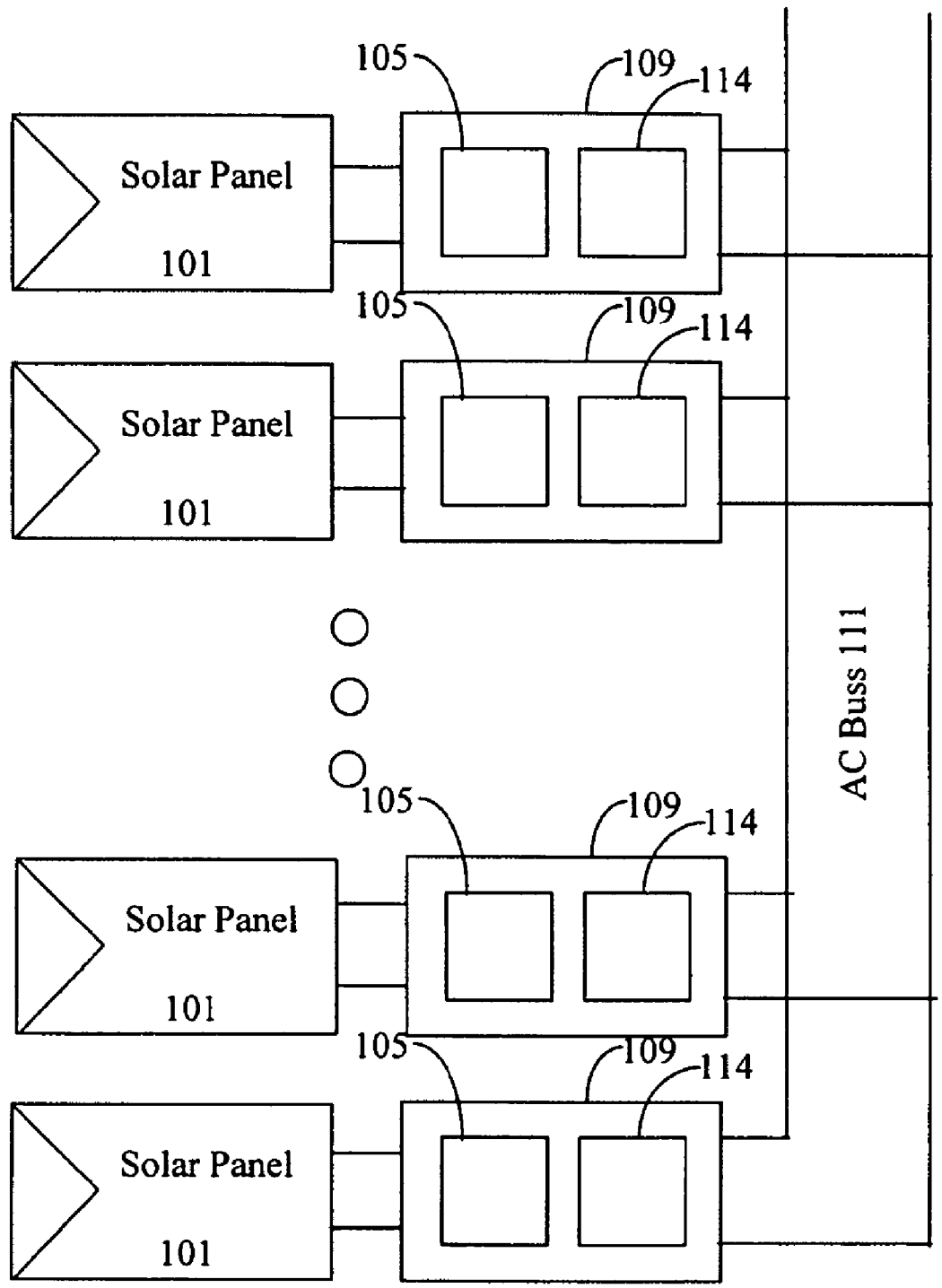
FIG. 1 illustrates one possible architecture for distributed power harvesting system.
Figure 2:
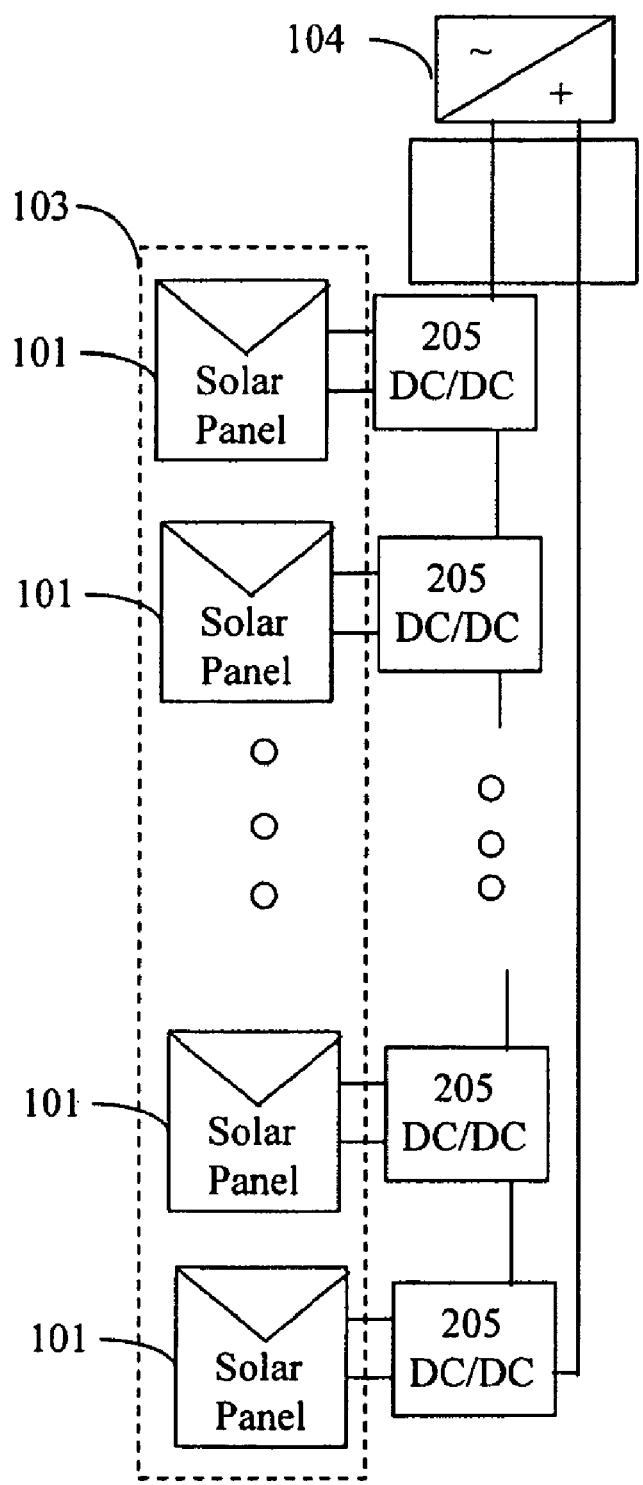
FIG. 2 illustrates another possible architecture for distributed power harvesting system using multiple DC power sources.

Aspects of the present invention provide a DC-to-DC converter that includes both current bypass paths and current blocking paths. The current bypass paths are for preventing the converter to open a series connected circuit. The current blocking paths are for preventing the converter from shorting a parallel connected circuit.

Aspects of the present invention provide a current bypass mechanism for the electrical power converters that are connected together in series in a distributed power harvesting system. According to aspects of the invention, each converter has one or more current bypass paths on failure. As a result, upon failure of one of the electrical power converters, current still flows through the failed electrical power converter and does not cut current from the entire series connection of the power sources. While described in the context of solar power technology, the reliability enhancing aspects of the present invention may be used in converters used in any distributed power network utilizing converters. For example it may be used to increase the reliability of batteries with numerous cells or hybrid vehicles with multiple batteries or fuel cells on board. The use of solar panels in the following is to provide better understanding by way of a concrete example.

Distributed power harvesting systems, according to embodiments of the present invention, provide a system for combining power from multiple direct-current electrical power sources. The power sources are each connected as inputs to one of multiple electrical power converters. In this particular example, each electrical power converter converts input power to output power by monitoring and controlling the input power at a maximum power level. Outputs of the electrical power converters are connected into a series-connected direct-current output. If an AC current is ultimately desired, an inverter may be used to invert the series-connected direct-current output of the converters into an alternating-current output from the inverter. The inverter may operate according to conventional inverter operation, i.e., control the output according to the specification dictated by the load. However, in this particular example, the inverter maintains its input voltage at a previously-determined voltage by varying the amount of current drawn from the series-connected converters.

For each electrical power converter, substantially all the input power is converted to the output power, and the controlling is performed by fixing the input current or voltage to the maximum power point of the DC power source, and allowing output voltage to vary. In each converter, a controller may perform the controlling by adjusting duty cycle using pulse width modulation, thereby transferring power from the input to the output. The controller may be a digital or an analog controller. The direct-current electrical power sources may be solar cells, solar panels, electrical fuel cells, electrical batteries, and the like. For each power source, one or more sensors provide data needed to perform the monitoring of the input power level.

In one aspect of the invention, each of the electrical power converters, used in the distributed power harvesting system, has a current bypass path. As a result, upon a failure in one of the electrical power converters which will prevent power harvesting from the module, current from the other modules in the string still flows through that failed electrical power converter.

Figure 3:
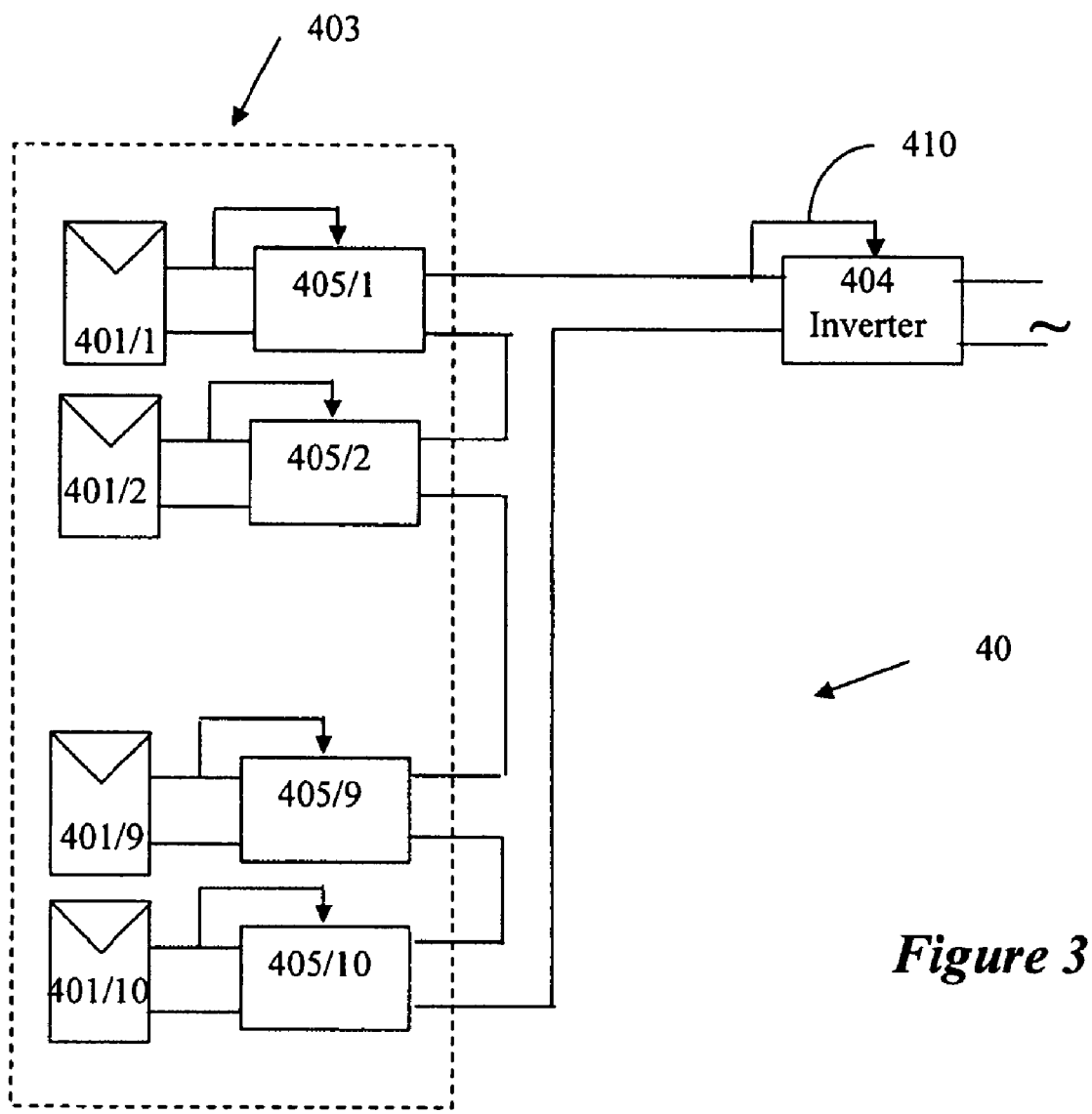
FIG. 3 shows a distributed power harvesting system using DC power sources according to aspects of the invention.

FIG. 3 illustrates a distributed power harvesting and conversion configuration 40, according to aspects of the present invention. Configuration 40 enables connection of multiple power sources, for example solar panels 401, to a single power supply. The series coupling of all of the solar panels is connected to an inverter 404. Instead of the inverter, a DC charge and discharge circuit may be used.

In configuration 40, each solar panel 401 is connected to a separate power converter circuit 405. The solar panel 401 and its associated power converter circuit 405 together form a module. Power converter circuit 405 adapts optimally to the power characteristics of the connected solar panel 401 and transfers the power efficiently from input to output. Power converters 405 can be buck converters, boost converters, buck/boost converters, flyback or forward converters. The converters 405 may also contain a number of component converters, for example a serial connection of a buck and a boost converter.

Each converter 405 includes a control loop that receives a feedback signal, not from the output current or voltage, but rather from the input coming from the solar panel 401. An example of such a control loop is a maximum power point tracking (MPPT) loop in solar array applications. The MPPT loop in the converter locks the input voltage and current from each solar panel 401 to its optimal power point. The MPPT loop of the converter 405 operates to perform maximum power point tracking and transfers the input power to its output without imposing a controlled output voltage or output current.

Converters 405, or the modules including the panels 401 and their associated converters 405, can be connected in series to form strings and the series connection of the modules are coupled in parallel to form arrays.

In conventional DC-to-DC voltage converters, the controller regulates the output voltage by monitoring the current or voltage at the input, and the current and voltage at the output. The controller determines the appropriate pulse width modulation (PWM) duty cycle to fix the output voltage to the predetermined value increasing the duty cycle if the output voltage drops while varying the current extracted from the input. In converters 405, according to embodiments of the present invention, the controller monitors the voltage and current at its input and determines the PWM in such a way that maximum power is extracted, dynamically tracking the maximum power point at its input. In embodiments of the present invention, the feedback loop is closed on the input power in order to track maximum power rather than closing the feedback loop on the output voltage as performed by conventional DC-to-DC voltage converters.

The outputs of converters 405 are series connected into a single DC output into the inverter 404, which converts the series connected DC output to an alternating current power supply.

The circuit of FIG. 3 provides maximum power available during continuous operation from each solar panel 401 by continuously performing MPPT on the output of each solar panel to react to changes in temperature, solar radiance, shading or other performance deterioration factors of each individual solar panel 401. As a result of having a separate MPPT circuit in each converter 405, and for each solar panel 401, in the embodiments of the present invention, each string 403 in the embodiment shown in FIG. 3 may have a different number of panels 401 connected in series. Furthermore panels 401 can be installed in different orientations, as solar panels 401 do not have to be matched and partial shading degrades the performance of only the shaded panel. According to embodiments of the present invention, the MPPT circuit within the converter 405 harvests the maximum possible power from panel 401 and transfers this power as output regardless of the parameters of other solar panel 401.

Another aspect of the present invention is to provide a greater degree of fault tolerance, maintenance and serviceability by monitoring, logging and/or communicating the performance of each solar panel 401. A controller used in the MPPT circuit of the converter 405, that is used to perform MPPT individually on each of the solar panels 401, may also be used to perform the monitoring, logging and communication functions. These functions allow for quick and easy troubleshooting during installation, thereby significantly reducing installation time. These functions are also beneficial for quick detection of problems during maintenance work. Aspects of the present invention allow easy location, repair, or replacement of failed solar panels 401. When repair or replacement is not feasible, bypass features of the current invention provide increased reliability.

Figure 4:
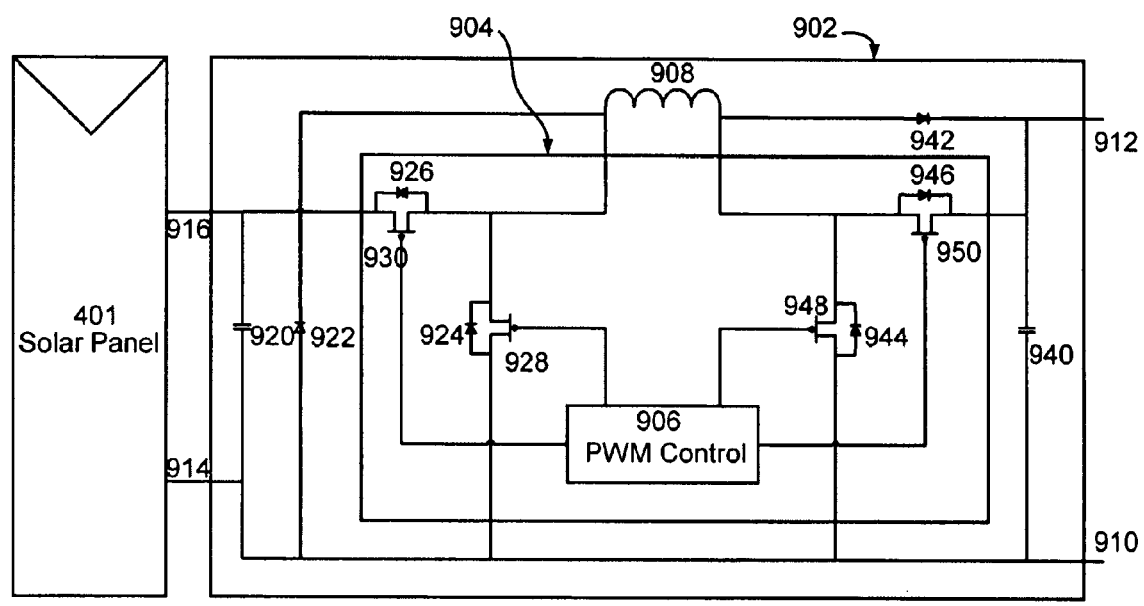
FIG. 4 is a power converter module, according to aspects of the invention.

FIG. 4 illustrates an exemplary DC-to-DC converter 405 according to aspects of the invention. DC-to-DC converters are used to either step down or step up a DC voltage input to a higher or a lower voltage output depending on the requirements of the circuit. The converter 405 is connected to a corresponding solar panel 401 at input terminals 914 and 916. The converted power of the solar panel 401 is output to the circuit through output terminals 910, 912. Between the input terminals 914, 916 and the output terminals 910, 912, the remainder of the converter circuit is located that includes input and output capacitors 920, 940, backflow prevention diodes 922, 942 and a power conversion circuit including controller 906 and an inductor 908.

The inputs 916 and 914 are separated by a capacitor 920, which acts as an open circuit to a DC voltage. The outputs 910 and 912 are also separated by a capacitor 940 that also acts an open to DC output voltage. These capacitors are DC-blocking or AC-coupling capacitors that short when faced with alternating current of a frequency for which they are selected.

Capacitor 940 coupled between the outputs 910, 912 also operates as a part of the buck and the boost converters discussed below.

Diode 942 is coupled between the outputs 910 and 912 with a polarity such that current may not backflow into the converter 405 from the positive lead of the output 912. Diode 922 is coupled between the positive output lead 912 through inductor 908, which acts as a short for DC current and the negative input lead 914 with such polarity to prevent a current from the output 912 to backflow into the solar panel 401.

A potential difference exists between the wires 914 and 916 due to the electron-hole pairs produced in the solar cells of panel 401. The converter 405 maintains maximum power output by extracting current from solar panel 401 at its peak power point by continuously monitoring the current and voltage provided by the panel and using a maximum power point tracking algorithm. The controller 906 includes an MPPT circuit for performing the peak power tracking. Peak power tracking and pulse width modulation, PWM, are performed together to achieve the desired input voltage and current.

The generated power is then transferred to output terminals 910 and 912. The outputs of multiple converters 405 may be connected in series, i.e. the positive lead 912 of one converter 405 is connected to the negative lead 910 of the next converter 405.

The converter 405 is shown as a buck plus boost converter. The term "buck plus boost" as used herein is a buck converter directly followed by a boost converter as shown in FIG. 4. If the voltage is to be lowered, the boost portion is substantially shorted. If the voltage is to be raised, the buck portion is substantially shorted. The term "buck plus boost" differs from buck/boost topology, which is a classic topology that may be used when voltage is needed to be raised or lowered. The efficiency of "buck/boost" topology is inherently lower then a buck or a boost. Therefore, the buck plus boost topology of FIG. 4 has a higher efficiency than the buck/boost topology. However, the circuit has to continuously decide whether it is bucking or boosting. The buck and boost portions of the converter 405 are described with reference to FIGS. 5 and 6.

The controller 906 may include a pulse width modulator, PWM, or a digital pulse width modulator, DPWM, to be used with the buck and boost converter circuits. The controller 906 controls both the buck converter and the boost converter and determines whether a buck or a boost operation is to be performed.

In one implementation, an integrated circuit (IC) 904 may be used that incorporates some of the functionality of converter 405. IC 904 is optionally a single ASIC able to withstand harsh temperature extremes present in outdoor solar installations. ASIC 904 may be designed for a high mean time between failures (MTBF) of more than 25 years. However, a discrete solution using multiple integrated circuits may also be used in a similar manner. In the exemplary embodiment shown in FIG. 4, the buck plus boost portion of the converter 405 is implemented as the IC 904. Practical considerations may lead to other segmentations of the system. For example, in one aspect of the invention, the IC 904 may include two ICs, one analog IC which handles the high currents and voltages in the system, and one simple low-voltage digital IC which includes the control logic. The analog IC may be implemented using power FETs which may alternatively be implemented in discrete components, FET drivers, A/Ds, and the like. The digital IC may form the controller 906.

Figure 5:
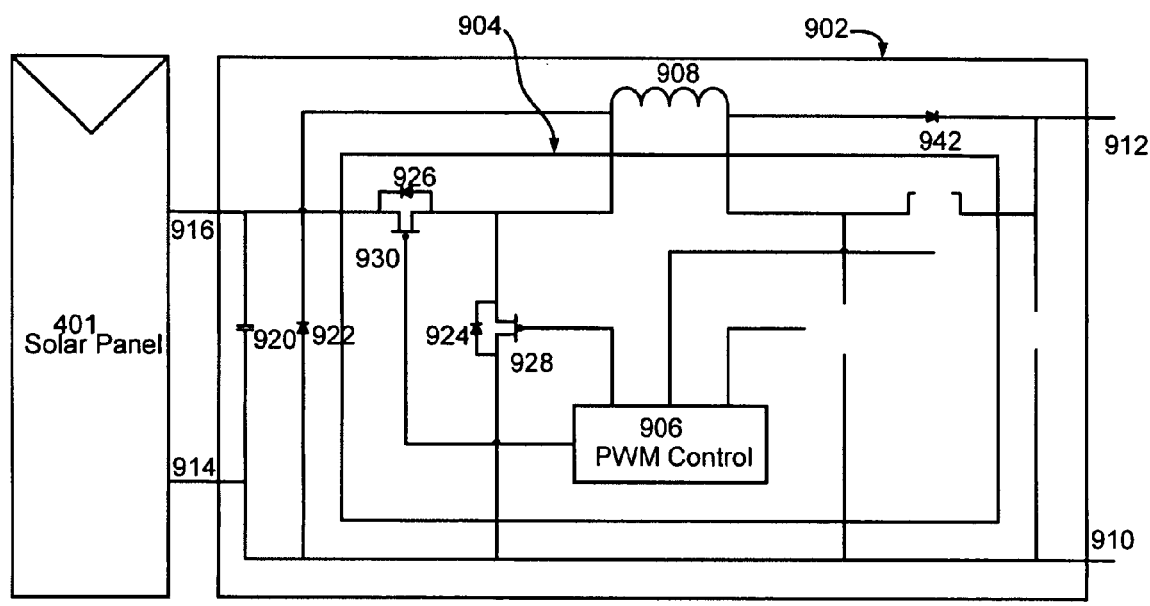
FIG. 5 shows a buck portion of one aspect of the power converter module of FIG. 4.

FIG. 5 shows the buck portion of the power converter module 405, according to embodiments of the present invention. In the exemplary circuit shown, the buck converter includes the input capacitor 920, transistors 928, and 930 a diode 922 positioned in parallel to transistor 928, and an inductor 908. The transistors 928, 930 each have a parasitic body diode 924, 926. Note, that FIG. 5 may also represent an embodiment wherein the converter comprises solely of a buck converter.

A buck converter is a step down DC-to-DC converter that, in its simplest form, uses two switches, an inductor and a capacitor. The two switches control the flow of current to the inductor. The buck converter alternates between connecting the inductor to the source voltage to store energy in the inductor and discharging the inductor into the load. In a perfect and loss-less circuit, the ratio of the output voltage to the input voltage is equal to the duty cycle of the switch that is providing current to the inductor. The duty cycle of the switch is the ratio of the on-time of the switch to the entire period, T, of the switch. Because this ratio is always less than or equal to one, the output voltage is always less than or equal to the input voltage.

Figure 6:
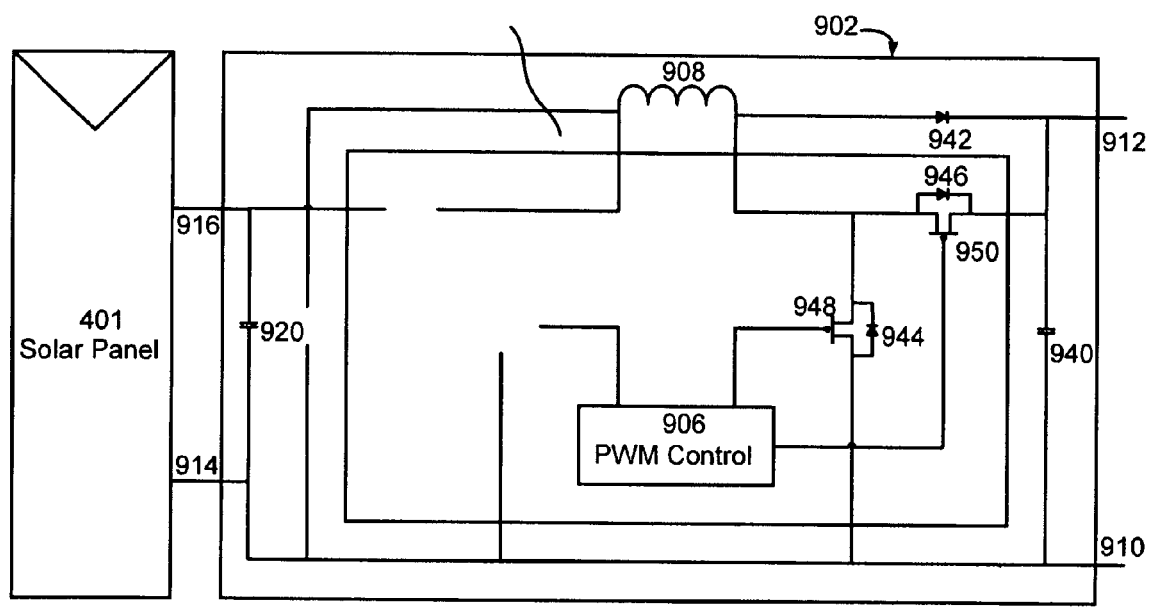
FIG. 6 shows a boost portion of one aspect of the power converter module of FIG. 4.

FIG. 6 shows the boost portion of the power converter module 405, according to embodiments of the present invention. In the exemplary circuit shown, the boost converter includes the inductor 908, which is shared with the buck converter, transistors 948 and 950 a diode 942 positioned in parallel to transistor 950, and the output capacitor 940. The transistors 948, 950 each have a parasitic body diode 944, 946. Note, that FIG. 6 may also represent an embodiment wherein the converter comprises solely of a boost converter.

A boost converter is a step up DC-to-DC converter that, in its simplest form, also uses two switches, an inductor and a capacitor. The two switches control the flow of current to the inductor. The boost converter alternates between connecting the inductor to the source voltage to store energy in the inductor and discharging the inductor into the load while also storing this energy in the capacitor. In a perfect and loss-less circuit, the ratio of the output voltage to the input voltage is equal to the inverse of the off portion of the switch that is providing current to the inductor. The off portion is one minus the duty cycle of the switch. Because this ratio is always greater than or equal to one, the output voltage is always greater than or equal to the input voltage.

Under some operating conditions, either the buck or boost converter, but not both, are used at any given time, at the discretion of the controller 906. Under some other operating conditions, when the desirable output voltage is similar to the input voltage, both the buck and the boost converters may be used in tandem.

The controller 906 is coupled to the transistors 928, 930, 948 and 950 and controls the operation of these transistors. The controller 906, therefore, can determine whether the buck converter or the boost converter is being used. If buck conversion is used, transistor 950 is shorted, providing a current path from the inductor 908 to the positive output lead 912, and transistor 948 is left open, effectively bypassing the boost converter. Similarly, if boost conversion is used, transistor 930 is shorted, providing a current path from the positive input lead 916 to the inductor 908, and 928 is left open, effectively bypassing the buck converter.

In FIG. 5, during the on-state of the buck portion, the controller 906 turns on the transistor 930 to connect the solar panel 401 to the inductor 908. All other transistors may be off or 950 may be shorted to provide a current path from the inductor without having to go through diode 942. During the on-state of the transistor 930, the input 916 is coupled to the output 912 through the transistor 926 and the inductor 908 and energy is being stored in the inductor 908. During the off-state of the buck portion of the converter 405, the controller 906 turns off the transistor 930 and turns on the transistor 928. The inductor 908 is cut off from the panel 401 that is providing power to it and the current through the inductor 908 decreases. The period of the buck portion is the sum of the on-time of the switch 930 and the on-time of switch 928. Over this period, the ratio of the voltage output from the converter 405 between outputs 910, 912 to the voltage input to the converter 405 between inputs 914, 916 is substantially equal to the ratio of the on-time of the switch 930 to the sum of the on-time of switch 930 plus the on-time of switch 928.

In FIG. 6, during the on-state of the boost portion, the controller 906 turns on the transistor 948 to connect the solar panel 401 to the inductor 908. All other transistors are off except for transistor 926 that is shorted to provide a current path from the panel 401 to the inductor 908. During the on-state of the transistor 948, the inputs 914, 916 are coupled to the inductor 908 and energy is being stored in the inductor 908. The inputs 914, 916 and outputs 910, 912 of the converter 405 are disconnected from each other. During the off-state of the boost portion of the converter 405, the controller 906 turns off the transistor 948 and turns on the transistor 950. The inductor 908 is connected to the outputs 910, 912 and the energy stored in the inductor is also stored in the capacitor 940. The period of the boost portion is the sum of the on-time of the switch 948 and the on-time of switch 950. Over this period, the ratio of the voltage output from the converter 405 between outputs 910, 912 to the voltage input to the converter 405 between inputs 914, 916 is substantially equal to the inverse of the on-time of the switch 950.

Reliability of the entire system is maintained given the distributed nature of aspects of the present invention. There are numerous converters 405 connected in each installation such that a failure in a single module presents the threat of causing an entire string 403 to malfunction. For example, if outputs 910, 912 of a single converter 405 are disconnected and converter 405 ceases to function, there is no longer a closed circuit connection through string 403. In order to prevent such a global failure, the converter 405 is designed to naturally bypass current in case of a failure in converter 405. Thus, only the power output from solar panel 401 attached and adjacent to failed converter 405 is affected, and all other solar panels 401 and converters 405 continue to normally provide power. Further, although a buck plus boost structure is shown in FIG. 4, other converter topologies, such as push-pull, flyback or forward converters, may be used with the similar capabilities for current bypass on failure.

In case of a failure in some other portion of the converter 405, there are several possible current routes. These current routes permit the current to bypass the faulty converter 405 and maintain a closed circuit in the string. When the converter 405 is constructed and a buck and boost circuit according to embodiments of the invention, at least two bypass circuits are included, one providing a bypass in case of the buck converter failure, and one providing a bypass in case of the boost converter failure. Additionally, bypass is provided in case of failure in the coil. According to one embodiment, the bypass circuit of the boost converter also serves as a bypass circuit in case of the coil's failure. A further overall bypass circuit is provided in case of failure of both the buck and boost converters. In one embodiment, this overall bypass remains active during all modes of operation, enabling at least part of the current from other power sources in the series to pass there-through. Additionally, when the converter 405 includes switches that are liable to fail, such as, e.g., transistors, each such switch is provided with a bypass, which may be a diode, or any active or passive circuit which serves this purpose.

The bypass mechanism (either diode or other) is not electronically stressed during the normal operation of the circuit, and only comes into play once a fault occurs. This is important, since the useful lifetime of these components is not reduced due to stress, and therefore they have a high probability to properly function.

Figure 7:
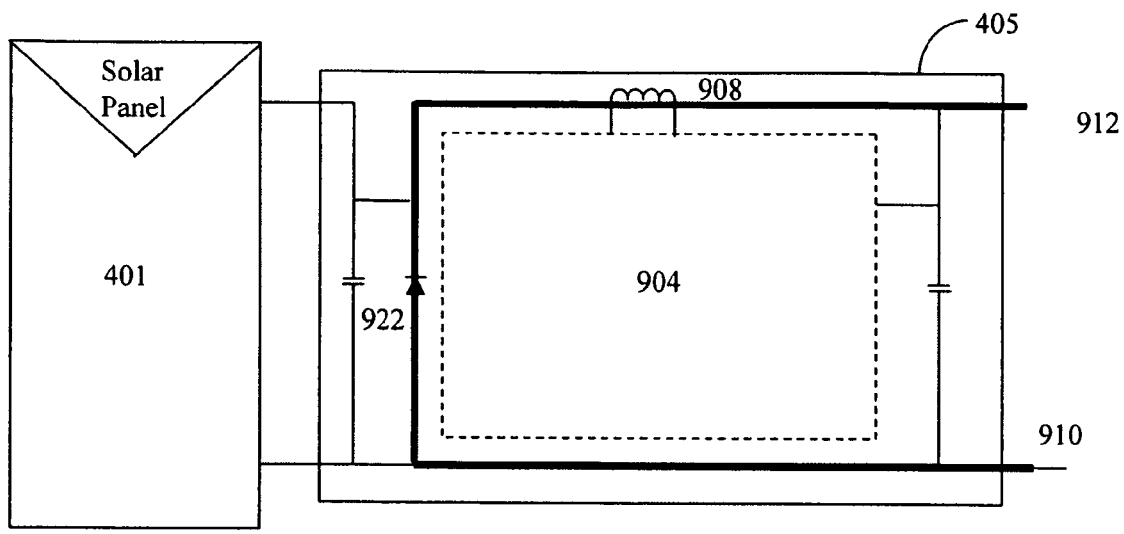
FIG. 7 shows one current bypass path in the power converter module of FIG. 4.

FIG. 7 shows one current bypass path in the power converter module of FIG. 4. The bypass circuit illustrated in FIG. 7 is the overall bypass circuit that enables continued operation of the series power system in case of total failure of converter 405. If IC 904 ceases to function and all its terminals disconnect, there is still a current path from terminal 910, through diode 922, inductor 908, diode 942 and out of terminal 912. Notably, in this embodiment this path remains active during all modes of operation of converter 405, i.e., even when converter 405 operates properly. Therefore, at least part of the current coming from up-stream sources may pass through this path. As illustrated in FIGS. 5 and 6, this bypass can also be implemented when only a buck or a boost converter is used.

Figure 8:
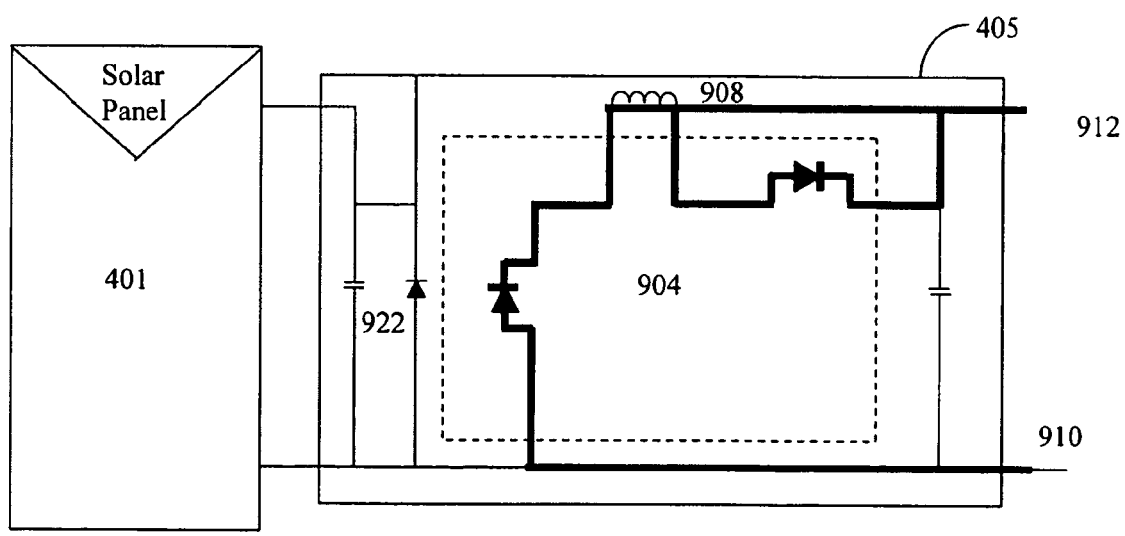
FIG. 8 shows another current bypass path in the power converter module of FIG. 4.

FIG. 8 shows another current bypass path in the power converter module of FIG. 4. Actually, what is shown in FIG. 8 is a triple bypass. One possible current path is from terminal 910 to diode 922 to inductor 908 to diode 942 and out of terminal 912, just as that shown in FIG. 7. As for another path, instead of diode 922, e.g., if diode 922 fails, the current may pass through the body diode 924 that is in parallel with the diode 922. This path is also available should the buck converter fail, e.g., transistor 928 fails. As for a further path, instead of diode 942, e.g., if diode 942 fails, the current may pass through the body diode 946 that is in parallel with the diode 942. As illustrated in FIG. 5, this bypass can also be implemented when only a buck converter is implemented.

Figure 9:
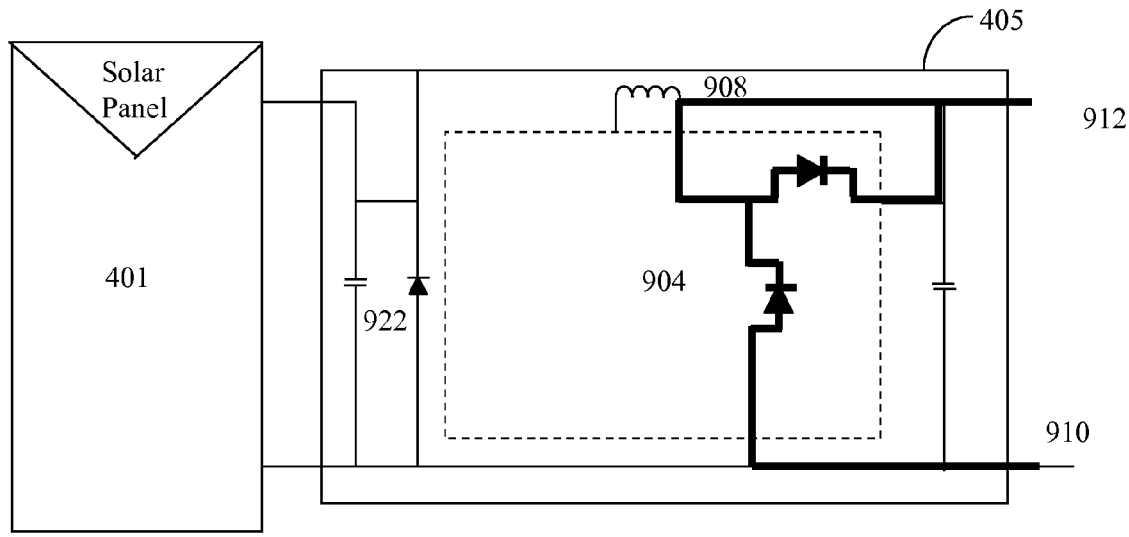
FIG. 9 shows a third current bypass path in the power converter module of FIG. 4.

FIG. 9 shows yet another current bypass path in the power converter module of FIG. 4. In case the buck converter fails, another possible current path is from terminal 910 to body diode 944 to diode 942 and to terminal 912. Instead of diode 942, the current may go through the body diode 946 that is in parallel with the diode 942. Notably, if inductor 908 fails, e.g., disconnects from the circuit or has one of its winding broken or burned, this bypass path is still available for the current and the current may still flow through body diode 944. Thus, even if converter 405 fails the rest of the solar array installation continues to function normally and to produce power. As illustrated in FIG. 6, this bypass can also be implemented when only a boost converter is used.

When the circuit is implemented in an IC, the inductor 908 is not shown as part of the IC 904. However, in one implementation it may be implemented as a part of the IC 904. In one implementation automotive silicon processes that are designed to withstand high voltages and high temperatures are used to develop the IC. In one implementation, the transistors may have a current rating of 30 A and voltage rating of over 100V, the capacitors may be ceramic capacitors having a capacitance of 1 µF at 80V, the inductor may be high power 10 µH inductor at 20 A. The diodes may be implemented using power diodes at 20 A and diode voltage of 0.4V, and they may either be implemented inside the IC or outside of it, as discrete components.

Figure 10:
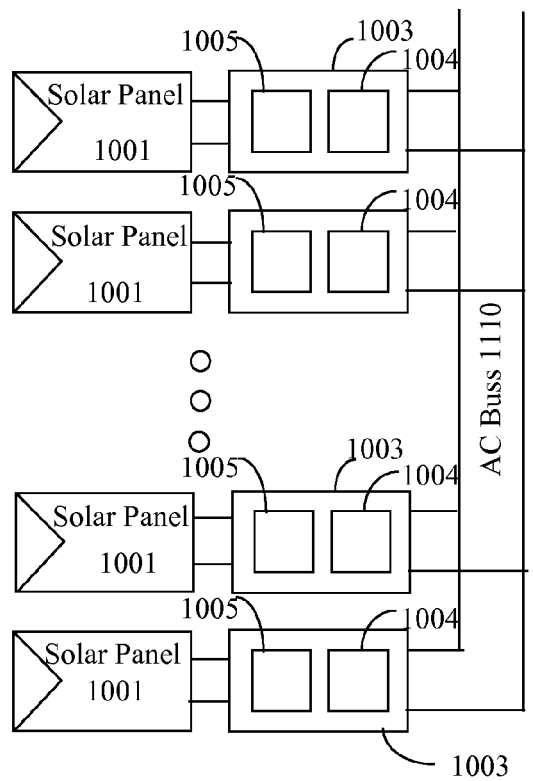
FIG. 10 shows a distributed power harvesting system using AC modules formed from DC power sources, according to aspects of the invention.

FIG. 10 shows a distributed power harvesting system using AC modules formed from DC power sources, according to aspects of the invention. In the system of FIG. 10, each DC power source 1001 is connected to its own AC module 1003. The AC module 1003 includes a DC-to-DC converter 1005 and an inverter 1004. The converter 1005 is used for DC to DC conversion of the collected voltage. The inverter 1004 is used for inversion of the DC input to an AC output. The input of each AC module 1003 is connected to one of the panels 1001. Outputs of the AC modules 1003 may be connected in parallel to an AC bus 1110.

The converter 1005 used in the AC module 1003 of FIG. 10, may be similar to the converter 902 of FIG. 4 according to aspects of the invention. Then if some of the components of the converter short due to failure, the diodes 942 and 922 prevent a short to occur across the converter.

As shown in FIG. 3 and FIG. 10 adding electronic elements in the series or parallel arrangement may reduces the reliability of the system, because if one electrical component breaks or fails it may affect the entire system. For a series-connected installation, if a failure in one of the serially connected elements causes an open circuit in the failed element, current ceases to flow through the entire series, thereby causing the entire system to stop function. For a parallel-connected installation, if a failure in one of the parallel connected elements causes a short circuit in the failed element, all current flows through the shorted element, thereby causing the voltage across the parallel nodes to go to zero. Aspects of the present invention provide a converter circuit where electrical elements of the circuit have one or more bypass routes associated with them that carry the current in case of the electrical element fails. For example, each switching transistor of either the buck or the boost portion of the converter has its own bypass. Upon failure of any of the switching transistors, that element of the circuit is bypassed. Also, upon inductor failure, the current bypasses the failed inductor through the parasitic diodes of the transistor used in the boost converter.

Figure 11:
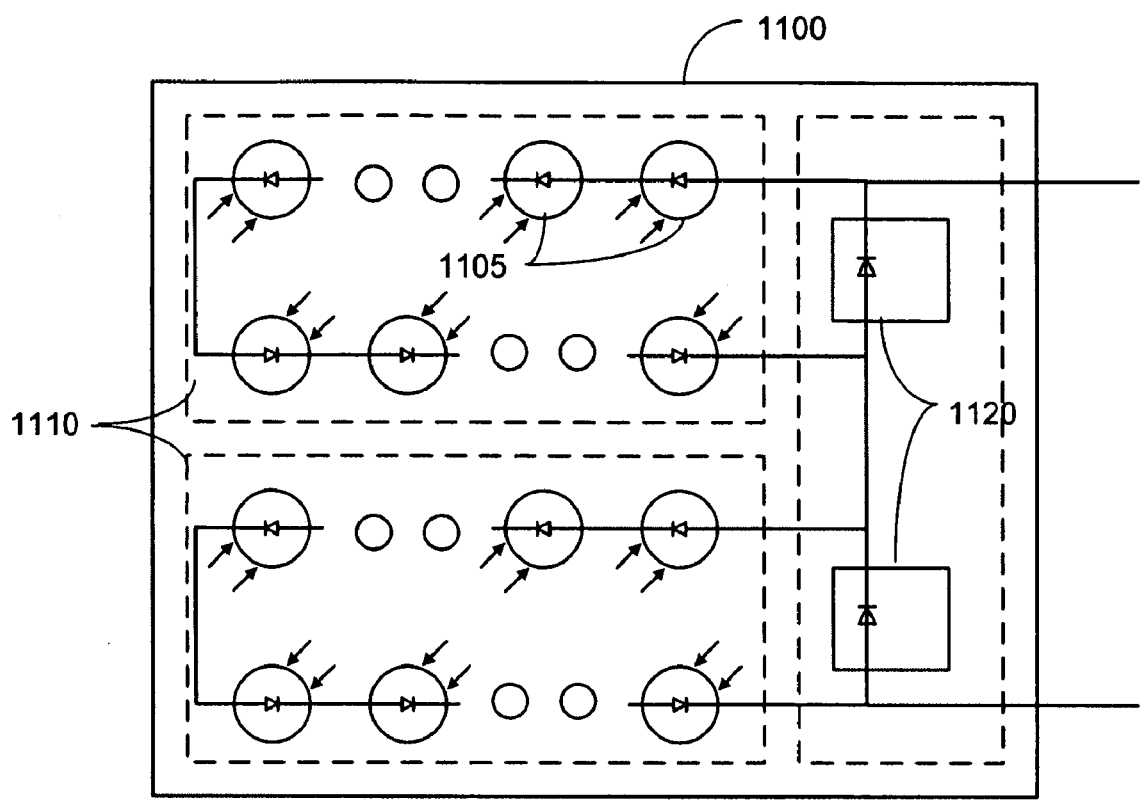
FIG. 11 illustrates an arrangement of a solar panel according to the prior art.

FIG. 11 illustrates an arrangement of a solar panel according to the prior art. In FIG. 11, solar panel 1100 comprises solar cells 1105, which are grouped into serially connected strings 1110. The strings 1110 are connected together in series. For each string 1110, a bypass diode 1120 is provided so that in the event of drop in power output of one string, that string may be bypassed via the respective diode 1120 instead of having the cells enter a negative voltage region, which will lead to power dissipation across them and may cause them to burn. However, when current flows through the diodes, they dissipate energy. For example, if a current of 5 A flows through a conventional diode having 0.7 volt cut-in voltage, the loss is 3.5 W. In practice the loss may easily amount to 10 W.

Figure 12:
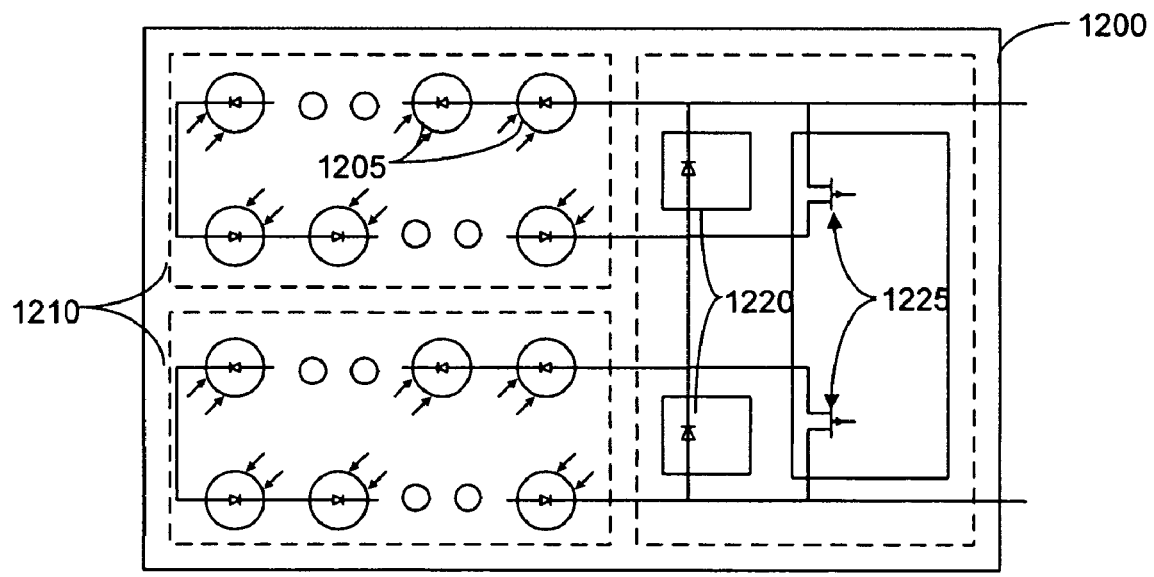
FIG. 12 illustrates an arrangement according to an embodiment of the invention for reducing the power loss in solar strings.

FIG. 12 illustrates an arrangement according to an embodiment of the invention for reducing the power loss in solar strings. In FIG. 12, the solar panel 1200 is made of solar cells 1205, which are grouped into serially connected strings 1210. The strings 1210 are connected together in series. For each string 1210, a bypass diode 1220 is provided so that in the event of drop in power output of one string, that string may be bypassed via the respective diode 1220. Additionally, one switching device, such as FET or IGBT (insulated gate bipolar transistor), 1225 is connected in a by-pass configuration so as to bypass the respective diode. Once it is sensed that current is flowing via one diode 1220 (or once the voltage across string 910 is sensed to be negative), its respective switching device 1225 is activated. This directs the current through the switching device, so that the loss of energy is drastically reduced. The sensing can be done by, for example, sensing the voltage across the string or the current across the diode.

Figure 13:
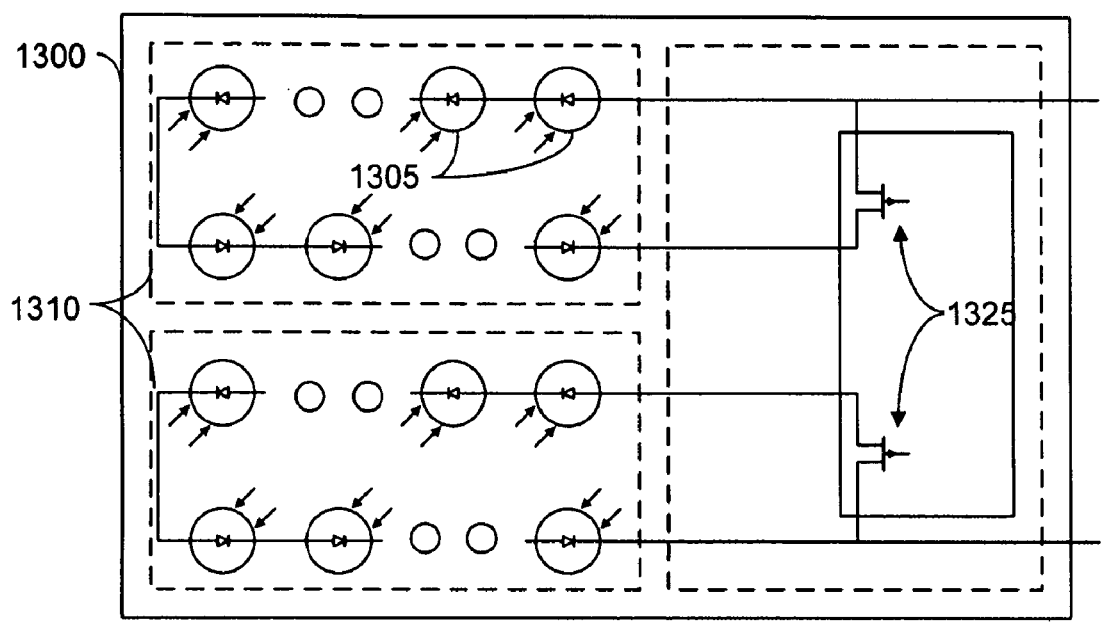
FIG. 13 illustrates another arrangement according to an embodiment of the invention for reducing the power loss in solar strings.

FIG. 13 illustrates another arrangement according to an embodiment of the invention for reducing the power loss in solar strings. In FIG. 13, the solar panel 1300 is made of solar cells 1305, which are grouped into serially connected strings 1310. The strings 1310 are connected together in parallel. For each string 1310, a bypass switching device 1325, such as FET or IGBT, is provided so that in the event of drop in power output of one string, that string may be bypassed via the respective switching device 1325. Once it is sensed that a string 1310 enters reverse bias (whether due to poor lighting or malfunction), the respective switching device 1325 is turned on so that current is flowing via its respective switching device 1325. The sensing can be done by, for example, sensing the voltage or current of the string.

Figure 14:
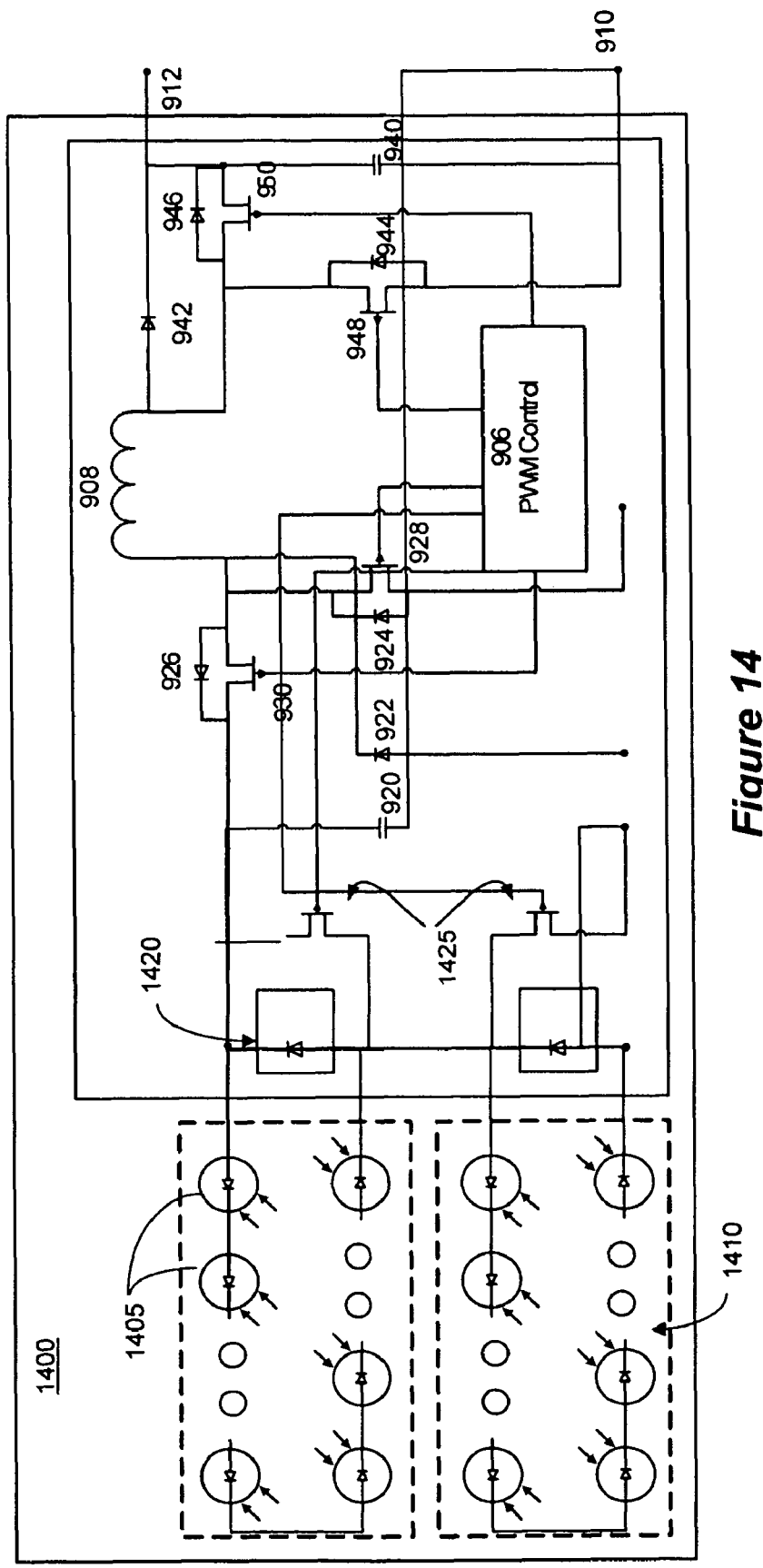
FIG. 14 illustrates an arrangement according to an embodiment of the invention for bypassing a solar string.

FIG. 14 illustrates an arrangement according to an embodiment of the invention for bypassing a solar string. That is, FIG. 14 illustrates how a converter, such as, for example, the converter of FIG. 6, may be utilized to trigger the bypass of the solar string and/or a diode coupled across a solar string. In FIG. 14, the solar panel 1400 is made of solar cells 1405, which are grouped into serially connected strings 1410. The strings 1410 are connected together in parallel. For each string 1410, a bypass diode 1420 is provided so that in the event of drop in power output of one string, that string may be bypassed via the respective diode 1420. However, as explained with respect to FIG. 13, the diodes may be eliminated. Additionally, one switching device, such as FET or IGBT, 1425 is connected in a by-pass configuration so as to bypass the respective string 1410 and/or diode 1420. Once it is sensed that a solar string enters reverse bias, its respective switching device 1425 is activated by the controller 906. This directs the current through the switching device 1425, so that the loss of energy is drastically reduced. The sensing can be done by, for example, sensing the voltage across the string or the current across the diode, as explained with respect to elements 703 and 704 of FIG. 7.

The present invention has been described in relation to particular examples, which are intended in all respects to be illustrative rather than restrictive. Those skilled in the art will appreciate that many different combinations of hardware, software, and firmware will be suitable for practicing the present invention. Moreover, other implementations of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A distributed power harvesting system comprising:
 a plurality of power sources each providing DC power;
 a plurality of converters, each converter comprising:
  input terminals receiving input voltage from, and coupled to, a respective power source from the plurality of power sources;
  output terminals for providing an output voltage;
  circuitry operatively connected to said input terminals and output terminals, wherein said circuitry receives and converts the input voltage to the output voltage, the circuitry comprising a buck portion providing a stepped down output voltage, a boost portion connected to the buck portion and adapted to provide a stepped up output voltage, and a controller selectively engaging the buck portion and/or the boost portion;
  at least two bypass paths adapted for bypassing at least part of the circuitry; wherein; and
  a maximum power point tracking circuits coupled to a respective power source for tracking power input from the respective power source, wherein the controller selectively engages the buck portion or the boost portion or both in response to signal from the maximum power point tracking circuit.

2. The distributed power harvesting system of claim 1, wherein the at least two bypass paths circumvent the buck portion and the boost portion.

3. The distributed power harvesting system of claim 1, wherein at least one of the at least two bypass paths passes through the buck portion.

4. The distributed power harvesting system of claim 1, wherein at least one of the at least two bypass paths passes through the boost portion.

5. The distributed power harvesting system of claim 1, wherein at least one of the bypass paths comprises:
   a first current path circumventing the buck portion and the boost portion;
   a second current path passing through the buck portion; and
   a third current path passing through the boost portion.

6. The distributed power harvesting system of claim 5, wherein the buck portion and the boost portion share an inductive coil;
   wherein at least one of the first, second and third, current paths passes through the inductive coil; and,
   wherein at least one of the first, second and third, current paths circumvents the inductive coil.

7. The distributed power harvesting system of claim 1, wherein the buck portion and boost portion share an inductor; and
   wherein the buck portion comprises a buck switching circuitry and a buck switching bypass path; and
   wherein the boost portion comprises a boost switching circuitry and a boost switching bypass path.

8. The distributed power harvesting system of claim 7, wherein:
   the buck switching circuitry comprises a plurality of buck switching elements and the buck switching bypass path comprises a plurality of current paths, each bypassing one of the buck switching elements; and
   the boost switching circuitry comprises a plurality of boost switching elements and the boost switching bypass path comprises a plurality of current paths, each bypassing one of the boost switching element.

9. The distributed power harvesting system of claim 1, wherein the output terminals are coupled in series to at least one other converter, to thereby generate a series connection of the plurality of converters, the distributed power harvesting system further comprising:
   an inverter coupled to the series connection of the plurality of converters and changing a direct current input from the converters to an alternating current output.

10. The distributed power harvesting system of claim 1, further comprising:
    an inverter coupled to each of the plurality of converters and forming an AC module together with the converter,
    wherein the AC modules are coupled in parallel to provide a collective current from the distributed power harvesting system, and
    wherein each converter comprises at least one current blocking element for preventing a short through the converter in a reverse direction.

11. The distributed power harvesting system of claim 1, wherein at least a portion each of the converters is implemented in an integrated circuit.

12. The distributed power harvesting system of claim 1, wherein at least one of the power sources comprises a solar panel.

13. The distributed power harvesting system of claim 1, wherein at least one of the power sources is a fuel cell.

14. A DC-to-DC power converter for converting an input voltage from a DC power source to an output voltage, the DC-to-DC power converter comprising:
    a buck portion providing a stepped down output voltage;
    a boost portion connected to the buck circuit and adapted to provide a stepped up output voltage;
    an inductor coupled to the buck portion and the boost portion;
    a controller engaging the buck portion and the boost portion;
    a maximum power point tracking (MPPT) circuit for providing a MPPT input signal, wherein the controller selectively engages the buck portion or the boost portion or both in response to the MPPT input signal; and,
    a boost bypass path providing a current path adapted for bypassing the boost portion through the buck portion.

15. The DC-to-DC power converter of claim 14, further comprising:
    a diode coupled in parallel with a first switch of the buck portion,
    wherein a current through the diode and a current through a parasitic diode associated with the first switch are parallel.

16. The DC-to-DC power converter of claim 14, further comprising a buck bypass path providing a current path bypassing the buck portion through the boost portion.

17. The DC-to-DC power converter of claim 16, further comprising:
    a first switch of the boost portion;
    a parasitic diode across said first portion;
    a diode coupled in parallel with said first switch of the boost portion;
    wherein a current through the diode and a current through a parasitic diode are parallel.

18. The DC-to-DC power converter of claim 14, wherein a portion of the DC-to-DC power converter is implemented in an integrated circuit.

19. A distributed DC photovoltaic power harvesting system comprising:
    a plurality of solar panels, each converting solar energy into DC output;
    a plurality of converters, each coupled to one of the solar panels, and each providing converted DC output; and
    an inverter coupled to a series connection of the converters and changing a DC input from the converters to an AC output;
    wherein each of the converters includes:
    a negative input lead and a positive input lead
    a negative output lead and a positive output lead;
    a first diode coupled to the negative output lead;
    a second diode coupled to the positive output lead;
    a maximum power point tracking circuit for tracking power input from the respective solar panel;
    a buck portion for providing a stepped down output voltage;
    a boost portion for providing a stepped up output voltage;
    an inductor coupled between the first diode and the second diode, the inductor being shared by the buck portion and the boost portion; and
    a controller for selectively engaging the buck portion or the boost portion or both responsive to the maximum power point tracking circuit;
    wherein a first current bypass route passes from the negative output lead to the first diode, to the inductor, to the second diode and to the positive output lead, wherein the first diode and the second diode prevent current flow from the positive output lead to the negative output lead.

20. The distributed DC photovoltaic power harvesting system of claim 19, further comprising a second current bypass route passing from the negative output lead to the second switch, to the inductor and to the positive output lead.

21. The distributed DC photovoltaic power harvesting system of claim 20, further comprising a third current bypass route passing from the negative output lead to the first diode, to the inductor, to the second diode and to the positive output lead.

* * * * *